(12) United States Patent
Memon et al.

(10) Patent No.: US 8,407,192 B2
(45) Date of Patent: Mar. 26, 2013

(54) DETECTING A FILE FRAGMENTATION POINT FOR RECONSTRUCTING FRAGMENTED FILES USING SEQUENTIAL HYPOTHESIS TESTING

(75) Inventors: Nasir Memon, Holmdel, NJ (US); Anandabrata Pal, New Rochelle, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 509 days.

(21) Appl. No.: 12/418,578

(22) Filed: Apr. 4, 2009

(65) Prior Publication Data
US 2010/0257146 A1    Oct. 7, 2010

(51) Int. Cl.
*G06F 7/00*    (2006.01)
*G06F 17/30*    (2006.01)
(52) U.S. Cl. ........................................ 707/693; 707/796
(58) Field of Classification Search .................. None
See application file for complete search history.

(56) References Cited

U.S. PATENT DOCUMENTS

| 7,415,382 | B1 * | 8/2008 | Bickford et al. | ............. | 702/178 |
| 2007/0198607 | A1 * | 8/2007 | Memon et al. | ............. | 707/202 |
| 2008/0279418 | A1 * | 11/2008 | Martinek et al. | ............. | 382/100 |

OTHER PUBLICATIONS

"Detecing file fragmentation point using sequential hypothesis testing", Pal et al., Digital Investigation May 2008 S2-S13, 12 pages.*
"Carving contiguous and fragmented files with fast object validation", simson L. Garfinkel, Digital Investigation 2007, S2-S12, 11 pages.*

* cited by examiner

*Primary Examiner* — Charles Kim
*Assistant Examiner* — Miranda Huang
(74) *Attorney, Agent, or Firm* — John C. Pokotylo; Straub & Pokotylo (57) ABSTRACT

File carving is a technique whereby data files are extracted from a digital device without the assistance of file tables or other disk meta-data, and can therefore be used to recover files that are fragmented. Sequential hypothesis testing procedures are used to detect a fragmentation point of a file by sequentially comparing adjacent pairs of blocks from the starting block of a file until the fragmentation point is reached. The detected fragmentation point can be used to help recover the fragmented file. Such a serial analysis helps to minimize errors and improve performance.

19 Claims, 6 Drawing Sheets

DETECTING A FILE FRAGMENTATION POINT FOR RECONSTRUCTING FRAGMENTED FILES USING SEQUENTIAL HYPOTHESIS TESTING

§1. BACKGROUND OF THE INVENTION

§1.1 Field of the Invention

The present invention concerns the recovery of fragmented files. In particular, the present invention concerns finding fragmentation points of a fragmented file for purposes of reassembling the file.

§1.2 Background Information

With the ever increasing adoption of digital storage mediums for both legitimate and criminal use, the need for more sophisticated data recovery and forensic recovery products have also increased. Most file systems and storage devices store data by dividing it into many clusters and by maintaining the list of clusters (file-table) used for storing the data of each file. For example, in the file system FAT-32 the root table entry with the file name will point to the first cluster of the file, which in turn will point to the next cluster, and so on, until the last cluster of the file. When a file is accessed, the data is retrieved in sequence from this list of clusters. Similarly, deletion of a file is typically realized by removing a file's entry from the file table. Traditional data recovery and forensics products attempt to recover data by analyzing the file system and extracting the data pointed to by the file system.

Traditional recovery techniques fail to recover data when the file system is corrupted, not present, or has missing entries. So-called "file carving" was introduced to recover files from the "unallocated" space of a disk (i.e., the area of the disk not pointed to by the file system). The initial and still by far most common form of file carvers simply analyze headers and footers of a file and attempt to merge all the blocks in between. One of the most well known of these file carvers is "Scalpel." (See, e.g., the article, Richard III Golden G., Roussev V., "Scalpel: a Frugal, High Performance File Carver," *Proceedings of the* 2005 *Digital Forensics Research Workshop, DFRWS*, (August 2005).) However, these file carvers still fail to recover files that are fragmented.

Figure 1:
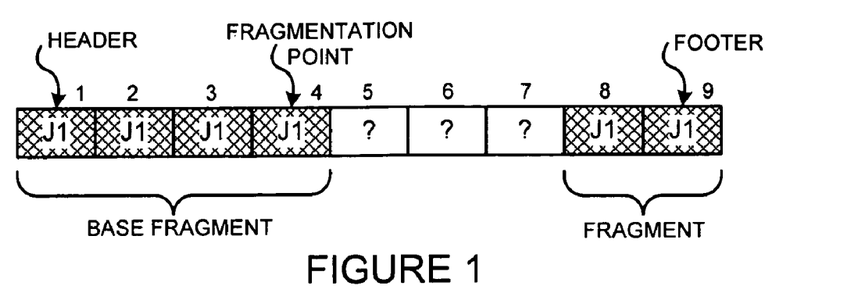
FIG. 1 illustrates a simplified example of a fragmented file.

A file is said to be "fragmented" when it is not stored on a continuum of blocks. (The meaning of the term "block" is intended to include "clusters".) For example, file fragmentation is said to occur when a file is not stored in the correct sequence on consecutive blocks on disk. In other words, if a file is fragmented, the sequence of blocks from the start of a file to the end of the file will result in an incorrect reconstruction of the file. FIG. 1 provides a simplified example of a fragmented file. In FIG. 1, the file J1 has been broken into two fragments. The first fragment starts at block 1 (which includes the file header) and ends at block 4. The second fragment starts at block 8 and ends at block 9 (which includes the file footer). This file is considered to be bi-fragmented as it has only two fragments.

Certain terms used in this application are now defined. A "block" is the size of the smallest data unit that can be written to disk (which can be either a disk sector or cluster). To avoid confusion, the term "block" is used. The notation "$b_y$" will be used to denote the block numbered y in the access order. A "header block" is a block that contains the starting point of a file. A "footer block" is a block that contains the ending point of a file. A "fragment" is considered to be one or more sequentially connected blocks of a file that are not sequentially connected to other blocks of the same file. Fragmented files are considered to have two or more fragments though one or more of these might not be present on the disk anymore. (That is, it is possible for one or more fragments to be lost.) Each fragment of a file is assumed to be separated from each other by an unknown number of blocks. A "base-fragment" is the starting fragment of a file and contains the header as (or in) its first block. A "fragmentation point" (or "fragmentation point block") is the last block belonging to a fragment before fragmentation occurs. A file may have multiple fragmentation points if it has more than two fragments. A "fragmentation area" is a set of consecutive blocks $b_y$, $b_{y+1}$, $b_{y+2}$, $b_{y+3}$ ... containing the fragmentation point. An "end of fragment" block may be a footer block or some other block at the end of a fragment (e.g., a block at the end of a file without a footer, a block at the end of a partially reconstructed file, etc.).

§1.2.1 Recovering Fragmented Files

It is a difficult challenge in the field of "data carving" to recover files when they are fragmented into two or more pieces. It has been determined that fragmentation on a typical disk is less than 10%. (See, e.g., the article, S. Garfinkel, "Carving Contiguous and Fragmented Files with Fast Object Validation," *Proceedings of the* 2007 *Digital Forensics Research Workshop, DFRWS*, (Pittsburgh, Pa., August 2007), referred to as "the Garfinkel paper" and incorporated herein by reference.). Unfortunately, however, the fragmentation level of forensically important file types (e.g., images, office files, email, etc.) is relatively high. Among the main findings of the Garfinkel paper are that up to 42% of PST files (outlook email), 17% of Microsoft Word files and 16% of JPEGs are fragmented. It is, therefore, clear that recovery of fragmented files is a critical problem in digital forensics.

Although the start and end points of a file can be identified by specific markers (e.g., file headers and footers), the point (or block) at which a file fragments and the point (or block) at which the next fragment starts can be extremely difficult to ascertain. Identifying these points may require a detailed understanding of individual file formats. Existing techniques (such as those introduced in §1.2.2 below) do not scale well when dealing with hundreds of thousands of blocks, and files that may be fragmented into more than two fragments.

Although the Garfinkel paper showed that bi-fragmented fragmentation is the most common type of fragmentation, it is not uncommon to have files fragmented into three or more pieces. The fragmentation statistics of the Garfinkel paper come from identifying over 350 disks containing FAT, NTFS and UFS file systems. Fragmentation typically occurs under one of the following four scenarios.

First, fragmentation can occur when there is low disk space. More specifically, if disk space is low and the disk is not defragmented, there may be many small groups of blocks (or clusters) that are available for storing information. However, future files to be stored may be larger than the largest of these free groups of blocks. Consequently, a file may need to be fragmented across multiple of these blocks.

Second, fragmentation can occur when appending or editing files. More specifically, if a file is saved on disk and then additional files are also saved starting at the cluster at which the original file ended, then fragmentation can occur if the original file is then appended (and increases to a size larger than the cluster size). Some file systems like the Amiga Smart File System (See, e.g., the document, "Amiga Smart Filesystem," available at http://www.xs4all.nl/ hjohn/SFS.) may attempt to move the whole file in such scenarios. Some other file systems like UFS attempt to provide "extents" which are attempts to pre-allocate longer chunks in anticipation of appending. (See, e.g., the article, McVoy L. W. and Kleiman S. R., "Extent-Like Performance From A UNIX File System,"

*Proceedings of USENIX: Winter '91*, pp. 33-43 (Dallas, Tex., 1991).) Another technique called delayed allocation used in file systems like XFS (See, e.g., the article, A. Sweeney, D. Doucette, W. Hu, C. Anderson, M. Nishimoto and G. Peck, "Scalability In The XFS File System," *Proceedings of the USENIX* 1996 *Annual Technical Conference*, (San Diego, Calif., 1996).) and ZFS reserve file system blocks but attempt to delay the physical allocation of the blocks until the operating system forces a flushing of the contents. Unfortunately, although some of these techniques can reduce fragmentation, they cannot eliminate fragmentation completely.

Third, fragmentation can occur due to so-called "wear leveling algorithms" in next generation storage devices, such as solid state devices. More specifically, some solid state devices currently use proprietary wear-leveling algorithms to store data. (See, e.g., the document, STORAGEsearch.com "Data Recovery from Flash SSDs?" available at http://www.storagesearch.com/recovery.html.) If the information mapping the logical geometry of the disk to the physical geometry is destroyed or corrupted, then any data extracted will be fragmented, with no easy way of determining the correct sequence of blocks to recover files.

Fourth, fragmentation can occur due to writing techniques employed by some file systems. More specifically, in rare cases the file system itself will force fragmentation. For example, the Unix File System will fragment files that are long or have bytes at the end of the file that will not fit into an even number of sectors. (See, e.g., the document, Brian Carrier, "File System Forensic Analysis," (Pearson Education, March 2005).)

To recover fragmented files correctly, a file carver must be able to determine the starting point of a file and the correct blocks that are required to reconstruct the file. In essence it is a three step process including (1) identifying the starting point of a file, (2) identifying blocks belonging to file, and (3) ordering the blocks correctly to reconstruct the file. Two published techniques that attempt to follow this three step process are introduced in §1.2.2 below.

§1.2.2 Know Techniques for Recovering Fragmented Files

Two known techniques for recovering fragmented files include bifragment gap carving and graph theoretic carving. Each is introduced below.

§1.2.2.1 Bifragment Gap Carving

The Garfinkel paper introduced a so-called "fast object validation" technique for recovering fragmented files. This technique recovers files that have headers and footers and are fragmented into only two fragments (also referred to as "bi-fragmented"). This technique works only for files that can be validated and/or decoded.

"Decoding" is the process of transforming information in the data blocks associated with a file into its original format that describes the actual content. Many file types, like JPEG, MPEG, ZIP, etc., have to be decoded before their content can be understood.

Object "validation" is the process of verifying if a file obeys the structured rules of its file type. Therefore, an object validator will indicate whether a block violates the structure or rules required of the specific file or file type. For example in the PNG file format, the data can be validated through cyclic redundancy checking ("CRC"), and a mismatch will indicate either data corruption or fragmentation. A decoder can be trivially used as an object validator by observing whether or not it can correctly decode each block in the sequence.

The bifragment gap carving ("BGC") recovery technique exhaustively searches all combinations of blocks between an identified header and footer, while excluding different numbers of blocks until a successful decoding and/or validation is possible. More specifically, let $b_h$ be the header block, $b_f$ be the last block of the first fragment of a file, $b_s$ be the starting block of the second fragment, and $b_f$ be the footer block. Blocks $b_h$ and $b_z$ are known and $b_f$ and $b_s$ have to be determined. For each gap size g, starting with size one, all combinations of $b_f$ and $b_s$ are designated so that they are exactly g blocks apart (i.e., g=s−f). A validator/decoder is then run on the byte stream representing blocks $b_h$ to $b_f$ and $b_s$ to $b_z$. If the validation fails, $b_f$ and $b_s$ are readjusted and the process continued until all choices of $b_f$ and $b_s$ are tried for that gap size (until validation passes), after which the gap size is incremented. This continues until a validation returns "true" or the gap size can't be increased any further.

Although the BGC technique performs satisfactorily when the two fragments are close to each other, it has a number of limitations for the more general case. First, the BGC technique does not scale for files fragmented with large gaps. If n is the number of blocks between $b_h$ and $b_z$, then in the worst case, $n^2$ object validations may be required before a successful recovery. Second, for files with more than two fragments, the number of object validations that need to be performed can become impractically high. This is because n−1 gap sizes are used in parallel, where n is the number of fragments in the file. It is also extremely unlikely that n can be determined beforehand. Third, successful decoding and/or validation does not necessarily mean that a file was reconstructed correctly. More specifically, decoders will give an error when the data in the blocks do not conform to inherent decoding rules or structure. For example, a standard JPEG decoder will stop with an error when a retrieved bit pattern has no corresponding entry in the Huffman code table. However, if a decoder does not give an error, this does not necessarily mean that the reconstructed file is correct. Fourth, many file types cannot be validated by their structure or do not require decoding. For example, 24-bit BMPs have a header, followed by pixel values where each pixel is represented with three bytes, and has no footer. If a bitmap image is fragmented, any block can be considered to be a candidate for the fragmentation point and the starting point of another fragment. Object validation will fail in such a case. Finally, missing or corrupted blocks for a file will often result in the worst case.

§1.2.2.2 Graph Theoretic Carving

The article, A. Pal and N. Memon, "Automated Reassembly of File Fragmented Images Using Greedy Algorithms," *IEEE Transactions on Image Processing*, pp. 385-393 (February 2006, referred to as "the Pal-Memon article" and incorporated herein by reference) formulated an image reassembly problem as a k-vertex disjoint graph problem. Reassembly is then done by finding an optimal ordering of blocks. This technique does not require object validations or decoding, but rather utilizes a matching metric to indicate the likelihood that a block follows another. For file types that can't be validated based on their structure (24 bit BMPs), analysis of the actual contents of each file is required to determine if a block should be paired with another block. However, even if a block can be validated the contents of each block are still analyzed and matching metrics created. Matching metrics differ according to the file type. With images, for example, the matching metric is generated by analyzing the pixel boundary created by the merging of two blocks.

Utilizing the matching metric, (See, e.g., the Pal-Memon article.) presents three algorithms using two heuristics. Only the parallel unique path ("PUP") algorithm using the greedy heuristic is described here as this was found to have the best combination of performance and results. PUP is a modified Dijkstra's single source shortest path algorithm (See, e.g., the article, E. W. Dijkstra, "A Note On Two Problems in Connexion with Graphs," *Numerische Mathematik*, pp. 269-271 (1959).), used to reassemble multiple files simultaneously. Starting with the file headers of each file, the best match for each header is chosen and then the header-block pair with the best of all the best matches is merged to the header. The process is repeated until all files are reconstructed. More formally, the k file headers $(b_{h1}, b_{h2}, \ldots b_{hk})$ are stored as the starting blocks in the reconstruction paths $P_i$ for each of the k files. A set $S=(b_{s1}, b_{s2}, \ldots, b_{sk})$ of current blocks is maintained for processing, where $b_{si}$ is the current block for the $1^{th}$ file. Initially, all the k starting header blocks are stored as the current blocks for each file (i.e., $b_{si}=b_{hi}$). The best greedy match for each of the k starting blocks is then found and stored in the set $T=(b_{t1}, b_{t2}, \ldots, b_{tk})$, where $b_{ti}$ represents the best match for $b_{si}$. From the set T of best matches, the block with the overall best matching metric is chosen.

Assuming that this best block is $b_{ti}$, the following steps are performed: (1) add $b_{ti}$ to reconstruction path of $i^{th}$ file, (i.e., $P_i = P_i \| b_{ti}$); (2) replace current block in set S for $i^{th}$ file (i.e., $b_{si}=b_{hi}$); (3) evaluate new set T of best matches for S; (4) again find best block $b_{ti}$ in T; and (5) repeat until all files are built.

Figure 2A:
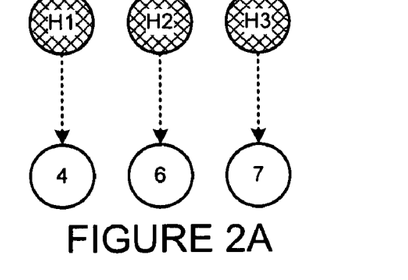
FIGS. 2A-2C show an example of the prior PUP algorithm where there are three files being reconstructed.
Figure 2B:
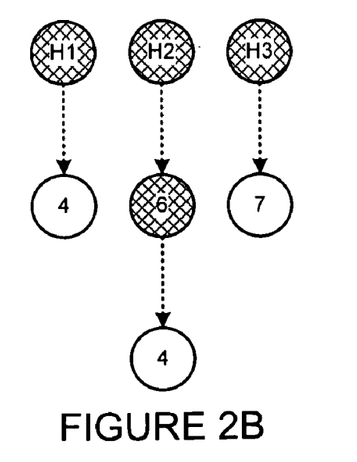
Figure 2C:
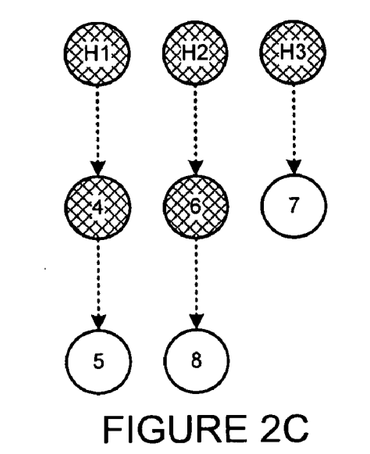

FIGS. 2A-2C show an example of the PUP algorithm where there are three files being reconstructed. FIG. 2A shows the header blocks $H_1$, $H_2$ and $H_3$ of the three files and their best matches. The best of all the matches is presented with a dotted line and is the $H_2$-6 pair of blocks. FIG. 2B now shows the new set of best matches after block 6 has been added to the reconstruction path of $H_2$. Now block 4 is chosen as the best match for both blocks $H_1$ and 6. However, the pair $H_1$-4 is the best. Therefore, 4 is added to the reconstruction path of $H_1$ and the next best match for block 6 is determined as shown in FIG. 2C. This process continues until all files are reconstructed.

While the reported results are very promising, the reassembly requires $O(n^2)$ computations, where n is the total number of blocks. Clearly, this system does not scale well when dealing with tens of thousands and even hundreds of thousands, or millions of blocks. The reason $O(n^2)$ computations are necessary is due to the assumption that fragmentation occurs completely randomly and fragment sizes can be as small as a single block. (Advantageously, though, since it assumes random fragmentation, it can handle files fragmented into more than two fragments.) Another problem with this technique is that it assumes all blocks are present and that there are no "holes."

§1.2.2.3 Need for Better Techniques for Recovering Fragmented Files

As mentioned above, both the BGC and PUP techniques have problems when dealing with fragmented files. Both require $O(n^2)$ computations in the worst case and fail to scale well for very large gaps, and/or files fragmented into many pieces. The BGC technique is only useful for reassembling two fragments, and relies on decoding or validation which can lead to inaccurate results. Thus, there is a need for improved techniques for recovering fragmented files, particularly when files are (or can be) broken into three or more fragments and particularly when a large number of blocks must be processed (e.g., in the worst case).

§2. SUMMARY OF THE INVENTION

The present inventors have discovered ways to improve upon known fragmented file recovery techniques. For example, the present inventors have recognized that although the PUP technique assumes that fragmentation is completely random, studies have shown that files with greater than three fragments are very rare and that file systems will almost never fragment a file on a block by block basis. The present inventors have also recognized that the BGC and PUP techniques would benefit if they could identify the "base-fragment" (i.e., the first fragment of a file). More specifically, a base-fragment can be identified if the last block of the base-fragment (i.e., the fragmentation point) is determined. Thus, embodiments consistent with the present invention may be used to determine the fragmentation points (and continuation points) of fragments.

Exemplary embodiments consistent with the present invention may be used to reassemble a fragmented file by (a) locating a file header to find a header block of the file, (b) determining, starting from the header block of the file, a fragmentation point block by sequentially testing adjacent blocks, (c) determining a continuation point block, which defines a starting point block of a next fragment of the file, by testing a set of candidate blocks with respect to fragmentation point block, (d) determining, starting from the continuation point block of the file, one of (A) a next fragmentation point block, (B) a footer block, and (C) an end of fragment block, by sequentially testing adjacent blocks, and (e) repeating (c) and (d) until one of (A) all fragments of the fragmented file have been determined, and (B) no more blocks can be found.

Exemplary embodiments consistent with the present invention may be used to assemble a file fragment by (a) locating a file header to find a header block of the file to define a file fragment portion, (b) determining, starting from the header block of the file, a fragmentation point block by sequentially testing adjacent blocks, wherein sequentially testing adjacent blocks includes (1) for a last block of the file fragment portion, determining a matching metric with a next adjacent block, (2) determining a test statistic using the determined matching metric, a probability distribution of values of the matching metric computed from adjacent blocks belong to the same file fragment, and a probability distribution of values of the matching metric computed from adjacent blocks not belong to the same file fragment, and (3) determining either (A) the next adjacent block belongs to the file fragment, (B) the next adjacent block does not belong to the file fragment, or (C) it is uncertain whether or not the next adjacent block belongs to the file fragment, using the test statistic and two threshold values. If it was determined that the next adjacent block belongs to the file fragment, then the next adjacent block is merged with the file fragment to define an updated file fragment portion, and acts (b)(1) through (b)(4) are repeated. If, on the other hand, it was determined that the next adjacent block does not belong to the file fragment, then one of (i) a block preceding the next adjacent block, (ii) a last block of the file fragment portion, and (iii) a block between the block preceding the next adjacent block and the last block of the file fragment portion, is defined as a fragmentation point block, blocks not adjacent to the fragmentation point block are tested to find a continuation point block, the continuation point block is merged with the fragment, and acts (b)(1) through (b)(4) are repeated. Otherwise, acts (b)(1)

through (b)(4) are repeated with a collection of adjacent blocks, which starts with the next adjacent block, until it is determined that either (A) the collection of adjacent blocks belongs to the file fragment, or (B) at least some of the collection of adjacent blocks do not belong to the file fragment.

§3. BRIEF DESCRIPTION OF THE DRAWINGS

FIGS. 3A-3C illustrate a simple example of a JPEG file that has been fragmented into two pieces, where the first piece includes four (4) blocks, the second piece includes three (3) blocks, and there are three unknown blocks in between.

§4. DETAILED DESCRIPTION

The present invention may involve novel methods, apparatus, message formats and/or data structures for reassembling fragmented files and for finding fragmentation points. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

By identifying the fragmentation point of a file, the performance of known techniques for recovering fragmented files, such as the BGC technique and the PUP technique for example, may be improved. Embodiments consistent with the present invention identify the fragmentation point(s) of a file using a sequential hypothesis test ("SHT") procedure. In at least some embodiments consistent with the present invention, the technique begins with a header block identifying the start of a file and then attempts to validate, via the SHT, each subsequent block following the header block. The fragmentation point is identified when the SHT identifies a block as not belonging to the file.

The fragmentation point detection problem is formalized and its solution is discussed in §4.1 below. Then, reassembling a fragmented file using a continuation point determination is described in §4.2. Next, exemplary matching metric tests are described in §4.3. Thereafter, exemplary methods for reassembling fragmented files are described in §4.4. Exemplary apparatus consistent with the present invention are described in §4.5. Examples of how a fragmentation point can be determined using techniques consistent with the present invention are described in §4.6. Finally, some conclusions regarding embodiments consistent with the present invention are set forth in §4.7.

§4.1 Fragmentation Point Detection

Figure 3A:
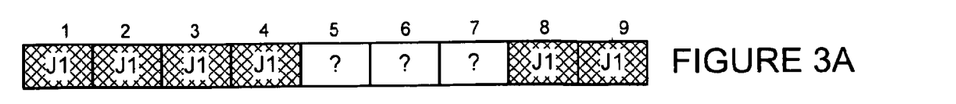
Figure 3B:
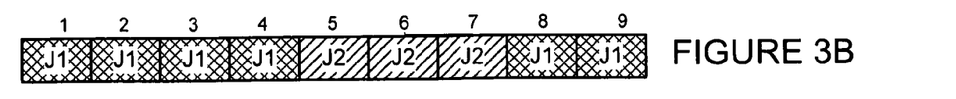
Figure 3C:
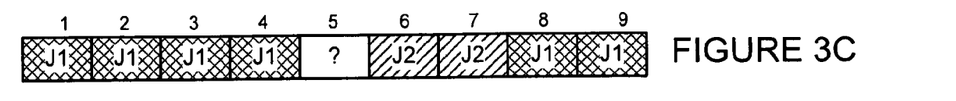

In FIGS. 3A-3C, a JPEG image $J_1$ has one file fragmentation point at the fourth block, $b_4$. This implies that blocks 1,2,3 and 4 all belong together in order. If a file is fragmented into more than two pieces, then multiple file fragmentation points will exist. If the file has no fragmentation then there will be no file fragmentation points. For a file fragmented into more than two pieces, at least some exemplary embodiments consistent with the present invention identify the starting file fragmentation point in the same way as the techniques for identifying subsequent file fragmentation points.

Other than the rare scenario where a file is fragmented because two or more of its fragments are swapped with each other, the gap between each of a file's fragment ending points and the next correct fragment's starting point contains data that does not belong to the file. The following tests utilize this information to help identify the fragmentation point.

Embodiments consistent with the present invention improve the PUP and BGC recovery techniques by assuming a more realistic fragmentation scenario. More specifically, rather than assuming that fragments are randomly scattered, such embodiments assume that most fragments have multiple blocks sequentially stored. As mentioned earlier, studies have shown that files with greater than four fragments are rare, and file systems will almost never fragment a file on a block by block basis. What this means is that fragments typically include tens, if not hundreds, or thousands, of blocks. Therefore, exemplary carving systems consistent with the claimed invention account for the fact that fragments typically include multiple blocks. Thus, such exemplary file carvers find the fragmentation points of each file by sequentially testing each block after the header block (or after a continuation point block). However, such embodiments need not rely on basic decoding/validation techniques alone to determine where a fragmentation point may occur.

Exemplary embodiments consistent with the present invention begin by reliably and efficiently detecting the fragmentation point $b_f$ and then attempt to find the starting block of the next fragment $b_s$ (i.e., the continuation point block). In the following, a general fragmentation point detection method is described in the context of a JPEG image file recovery method.

§4.1.1 Problem Formulation

Recall that the first fragment of a file is defined as a "base-fragment". The base fragment is composed of k physical data blocks that start with an identifiable bit pattern, such as a header. To find the fragmentation point, the total number of blocks k within a base-fragment may be determined. This determination should be made in a way that minimizes decision errors that falsely identify (or fail to identify) the fragmentation point.

Possible decision errors include "false addition" and "false elimination." False addition occurs when a random block that does not belong to the actual fragment is erroneously joined to the fragment. False elimination occurs when a block is separated from the fragment to which it belongs. Note that in fragmentation point detection, false addition of a random block is typically much more costly than a false elimination of a correct block. This is because a falsely eliminated block can be correctly merged with the fragment later, when all the unattributed data blocks are matched against successfully reconstructed base fragments. On the other hand, falsely added data blocks will not only cause an error in reconstruction of a base fragment, but they may also curtail the correct reconstruction of other fragments (and files) due to loss of continuity.

Given the beginning of a base-fragment, a binary decision could be made for each subsequent data block to determine whether or not the data block belongs to the base-fragment. This problem can be formulated as a hypothesis test and the corresponding analysis framework, based on false positive and false detection probabilities, can be extended to false addition and false elimination probabilities. For this purpose, a matching metric $Y_1$ may be computed between the data block $b_i$ in question and already identified blocks of the base-fragment, i.e., $b_0, b_1, \ldots b_{i-1}$, not necessarily just the immediately preceding block. That is, in a conventional hypothesis test, for each data block, a matching-metric is computed and an individual hard decision (i.e., a definite, local decision) is made for each block in the order they appear on the storage medium until a fragmentation point is detected. However, since data blocks before the fragmentation point are more likely to be appended to the base-fragment than blocks beyond the fragmentation point, decisions made based on a sequence of adjacent blocks will be more reliable.

More specifically, in a SHT fragment detection method consistent with the present invention, the number of observations $Y_1, Y_2, Y_3, \ldots$, associated with a set of blocks is not fixed in advance. Instead, they may be evaluated collectively as they become available and a test decision is made only when the resulting decision statistic (or "test statistic") is significantly low or high (that is, below a first threshold or above a second threshold). Otherwise, if the test statistic is in between these two bounds (that is, above the first threshold but below the second threshold), then a next block in the sequence is added and the test is continued.

Starting with the first data block of the base-fragment $b_0$, identified by a fixed pattern or header, subsequential data blocks $b_1, b_2, \ldots b_n$ are appended to $b_0$ (assuming the test result is above a threshold) and a matching-metric, $Y_1, Y_2 \ldots, Y_n$ is obtained in sequence with each addition. Accordingly, the hypothesis $H_0$ is defined as blocks $b_1, b_2, \ldots, b_n$ belong in sequence to the fragment and the hypothesis $H_1$ is defined as blocks $b_1, b_2, \ldots, b_n$ do not belong in sequence to the fragment. If the evaluated data blocks $b_1, b_2, \ldots, b_n$ do not yield to a conclusive decision, the test continues with the inclusion of the next block $b_{n+1}$ until one of the hypotheses $H_0$ or $H_1$ is confirmed. When hypothesis $H_0$ is true, the evaluated block(s) are merged to the base-fragment and a new test is started. Each time the test starts with a new data block in sequence, the matching statistic is computed with respect to the recovered part of the base-fragment. The test procedure finalizes after one of the following three conditions occur: (1) $H_1$ is true (in which case a fragmentation point is found); (2) the file is completely recovered; or (3) an error occurs because no data-block remains or remaining blocks are of a different file type.

Let Y represent the sequence $Y_1, Y_2, \ldots, Y_n$. In a sequential hypothesis test, a test statistic $\Lambda$ is computed as the likelihood ratio of observing sequence Y under the two hypotheses, which is expressed as the ratio of the conditional distributions of observed matching-metrics under $H_0$ and $H_1$ as:

$$\Lambda(Y) = \frac{Pr(Y \mid H_1)}{Pr(Y \mid H_0)} \quad (1)$$

Finally, a decision is made by comparing $\Lambda$ to appropriately selected thresholds as:

$$\text{outcome of test} = \begin{cases} H_1, \Lambda(Y) > \tau^+ \\ H_0, \Lambda(Y) < \tau^- \\ \text{inconclusive } \tau^- < \Lambda(Y) < \tau^+ \end{cases} \quad (2)$$

That is, if the test statistic (the likelihood ratio) $\Lambda(Y)$ is larger than $\tau^+$, hypothesis $H_1$ is assumed to be true. If $H_1$ is true, the fragmentation region has been found. If, on the other hand, test statistic $\Lambda(Y)$ is smaller than $\tau^-$, hypothesis $H_0$ is assumed to be true. If $H_0$ is true, all the blocks are merged and the test continues from the next sequential block. Finally, if neither hypothesis is considered true, testing continues with subsequent block(s) until the test statistic $\Lambda(Y)$ exceeds the threshold $\tau^-$ or falls under the threshold $\tau^-$, or until an end-of-file indicator is reached. The thresholds $\tau^-$ and $\tau^+$ can be chosen so as to place an upper bound on the probability of errors due to false eliminations ($P_{fr}$) and false additions ($P_{fe}$). (See, e.g., the document, A. Wald, "Sequential Analysis," (Dover, N.Y., 1947).) The thresholds $\tau^-$ and $\tau^+$ can be set as follows:

$$\tau^+ = \frac{1 - P_{fe}}{P_{fa}}; \text{ and } \tau^- = \frac{P_{fe}}{1 - P_{fa}} \quad (3)$$

The performance of the sequential fragment point detection method mainly depends on two factors—the choice of the "matching metric" and the accurate determination of the conditional probability mass functions under the two hypotheses. The choice of the matching metric should consider different file types and should capture semantic or syntactic characteristics of the file. The accurate determination of the conditional probability mass functions under the two hypotheses may depend on obtaining multi-dimensional probability distribution functions under the two hypotheses. Statistics revealing typical number of data-blocks in a file fragment (which might depend on various parameters like disk size, operating system, disk usage activity, etc.) may be used to determine the conditional probability mass functions. If such information is unavailable, it may be assumed that the matching metrics computed from each sequentially stored block are independent and identically distributed ("iid"). Note that when the data-block locations are not necessarily sequential, the iid assumption holds. For example, when all the base fragments are recovered, and a subsequent fragment for each file has to be identified from among all the remaining unassociated data blocks, such a model fits very well.

Under the iid assumption, the test statistic can be rewritten as:

$$\Lambda(Y) = \frac{Pr(Y|H_1)}{Pr(Y|H_0)} = \prod_{i=1}^{n} \frac{Pr(Y_i|H_1)}{Pr(Y_i|H_0)} \quad (4)$$

In this case, the test statistic can be incrementally updated with each observation through multiplication by the probability ratio associated with the most recently considered datablock. The test statistic $\Lambda(Y)$ may then be compared to the threshold(s) $\tau^+$ and/or $\tau^-$. Using this comparison, a hypothesis may be confirmed, or the test may be continued if the hypothesis cannot be confirmed.

§4.1.2 Reverse Fragmentation Point Detection

As noted earlier, falsely merging a data block with a base fragment, or eliminating it from a base fragment, may cause an error in the recovery process. Therefore, the fragment boundary is determined by identifying the last data block in sequence that belongs to the base fragment. Although the above SHT fragment detection procedure advantageously avoids false additions and false eliminations by not making a decision when the information is inconclusive, it can make accurate fragmentation point detection difficult. This is because each decision might be made on a sequence of blocks, rather than on a single block (Recall that Y represents the sequence $Y_1, Y_2, \ldots, Y_n$) and a fragmentation point can be anywhere in this sequence. That is, the test might determine that the fragmentation point occurs somewhere within this sequence, but does not determine where within the sequence the fragmentation occurred.

To determine where within a sequence the fragmentation point occurs, a reverse sequential test may be performed if the (forward) test is inconclusive, and the test statistic has to be updated by considering a new data block. For a given sequence (or "window") of observations in a forward test $Y_1$, $Y_2, \ldots, Y_n$ the observations towards the end of the sequence are more likely to be due to blocks that don't belong to the fragment. Visiting them first, while using the reverse test, enables the fragmentation point to be detected more accurately. (Since forward processing might use an averaging, borderline "no decisions" might not be detected.)

In a reverse hypothesis test, the test statistic is computed by traversing the measured matching metrics in reverse order (i.e., sequence $Y_n, Y_{n-1}, \ldots, Y_2$). The reverse test starts by considering $Y_n$ only. If the test determines the hypothesis $H_1$ to be true (that is, if it is determined that $b_n$ does not belong to base fragment), the reverse test is started with $Y_{n-1}$, and if the reverse test determines the hypothesis $H_1$ to be true, the reverse test is terminated and the forward testing continues. If, on the other hand, the reverse test is inconclusive, the test continues by considering the next to last data-blocks (i.e., $Y_n$, $Y_{n-1}$, going backwards from $Y_n, Y_{n-1}, Y_{n-2}$, etc.) until a decision is reached. The fragmentation point is deemed to be the most recently eliminated data block before the test finally confirms the $H_1$ hypothesis.

§4.1.3 When Exact Location of Fragmentation Point within Sequence cannot be Found Another issue is that the recovery of the base fragment will be continued via merging new blocks to it every time the test terminates in favor of $H_0$. However, the designated test statistics Y, by its definition, is computed between the known parts of the base fragment and the block(s) in question. Therefore, when both the forward and backward tests are inconclusive and further blocks considered do not form a boundary with the recovered part of the (e.g., image) fragment, the test should be forced to terminate. In this case, the fragmentation point might be assigned to the last block for which the $H_0$ hypothesis was found to be true and the blocks that could not be decided are not added to the base fragment. This is because, as mentioned above, erroneously adding a block to a fragment might have worse consequences than erroneously failing to add a block to a fragment (since the block can always be added later).

§4.2 Reassembling a Fragmented File Using a Continuation Point Determination Having identified the fragmentation point by itself is not enough (unless the fragmentation point is the end of file) for recovery. Once the base fragment has been identified, the starting block of the next fragment belonging to the file being reconstructed must be determined in order for the fragmented file to be recovered. A new model for a file carver is presented here. Recall that false eliminations (fragmentation point is identified before actual identification point) are preferable over false additions (late detection of fragmentation point), since the second step of an exemplary file carving method (e.g., a close region sweep, described below) will look at a large number of potential fragments to determine the next block to build the file. Therefore, a falsely eliminated block will be reconsidered (i.e., may still be merged with the fragment).

Exemplary file carvers consistent with the present invention may perform the following general acts:
(1) identify the starting block of file;
(2) sequentially check each block after the first to determine a fragmentation point or file end;
(3) if a fragmentation point is detected, find a starting point of next fragment (i.e., a "continuation point"); and
(4) continue with (2) from starting point of next fragment.

If more than one file is being reconstructed, the first act (1) may simply identify the data block(s) that include the file header(s) as is known. The information from this initial data block is then utilized to recover the base fragment through analysis of the following blocks until a fragmentation point is detected. Once the fragmentation point is determined, the starting block of the subsequent fragment is determined. Using information from the file recovered so far, the next fragmentation point (if the file has more than two fragments) is identified. This process is repeated until the file is completely or partially recovered from all the available fragments.

Section 4.2.1 describes a modified version of the PUP technique using SHT for a complete recovery solution. Then section 4.2.2 describes a modified version of the BGC technique using SHT for a complete recovery solution.

§4.2.1 PUP-SHT

Recall that the PUP algorithm was developed to reconstruct multiple files in parallel. An exemplary embodiment consistent with the present invention file carves fragmented files using SHT and PUP (referred to as "SHT-PUP"). SHT-PUP begins by choosing all available headers of a file-type and attempting to use sequential hypothesis testing ("SHT") as described above to determine the base-fragment and the fragmentation point. Once the fragmentation point of each base-fragment is identified, the remaining available blocks are classified (e.g., separated into bins) based on file type. This may be performed using keyword and statistical tests.

Keyword tests consistent with the present invention might use the Aho-Corasick algorithm (See, e.g., the article, Aho and M. Corasick, "Fast Pattern Matching: An Aid To Bibliographic Search," *Commun ACM*, Vol. 18, No. 6, pp. 333-340 (June 1975), incorporated herein by reference.), which is a string searching algorithm that locates elements of a finite set of strings within an input text. It matches all patterns "at once." Consequently, the complexity of the algorithm is linear with respect to the length of the patterns, plus the length of the searched text, plus the number of output matches. Statistical tests consistent with the present invention might be the same as those described above and might involve entropy of the data and the OSCAR method. (See, e.g., the articles: Martin Karresand and Nahid Shahmehri, "Oscar File Type Identification of Binary Data in Disk Clusters and RAM Pages," *IFIP Security and Privacy in Dynamic Environments*, Vol. 201, pp. 413-424 (2006); and Martin Karresand and Nahid Shahmehri, "File Type Identification of Data Fragments by Their Binary Structure," *IEEE Information Assurance Workshop*, pp. 140 147 (June 2006), both incorporated herein by reference and referred to collectively as "the Karresand-Shahmehri articles".).

It is shown in the Garfinkel article that the gap between fragments is rarely more than 80 blocks and that the majority of the time the gap is much smaller. In fact, a gap size of 8 blocks occurs in 4,327 files and the next closest was a gap size of 32 blocks that occurs in 1,519 blocks. As a result, at least some exemplary embodiments consistent with the present invention may use a "close region sweep" to determine the starting point of the next fragment. More specifically, using a close region sweep, for each base-fragment and fragmentation point identified, it is attempted to decode each of the blocks classified in the same file-type (e.g., belonging to the same bin), in an area of about X (e.g., X is no more than 5,000) blocks next to the base-fragment blocks. For each file being recovered, the top Z (e.g., Z=20) block results, based on the matching metric used, are stored. Since a block might match more than one file well (i.e., might be at the top of more than one of the top Z sets), it is only merged with the base fragment it matches best (the best of the best) and is removed as one of the Z candidates for the other files. Sequential hypothesis testing is continued for the extended base fragment until another fragmentation point is found. The process is then repeated until all files are built or have failed in finding good candidates.

SHT-PUP has the advantage of only serially comparing blocks until a fragmentation point is detected, and attempting to then continue from the "best" of available fragmentation points of all available files. Assuming a good matching metric, files with blocks yielding better matching metric scores, will be built first, thus reducing the blocks required to be analyzed for the other file recoveries.

§4.2.2 BGC-SHT

In addition, fragmentation point detection can also be used to enhance the efficiency of BGC. Recall that under BGC, starting with a gap size of 1 all possibilities of blocks between a header and footer are carved. If $b_f$ is the ending point of the first fragment and $b_f$ is the starting block of the next fragment, every combination of $b_f$ starting with $b_f$ greater than $b_{h+1}$ (block after header), needs to be evaluated. Fragmentation point detection can be used improve this by starting $b_f$ at $b_a$, where $b_a$ is the detected fragmentation point. For base-fragments with hundreds of files this dramatically improves the performance of BGC.

§4.3 Exemplary Matching Metric Tests

As discussed above, embodiments consistent with the present invention use a matching metric to determine a test statistic. Various exemplary matching metric tests, consistent with the present invention, are described in §§4.3.1 through 4.3.3 below.

§4.3.1 Syntactical Tests

With syntactical tests, the fragmentation point may be detected by identifying whether or not a block belongs to a file in question by (a) using keywords and signatures indicating different file types, and/or (b) analyzing content indicating an incorrect block. Each is described below.

Regarding using keywords and signatures indicating different file types, during recovery of a fragmented file, if a block is found to belong to some other file or file type, then it is assumed that a fragmentation point is reached. For example, while recovering a JPEG file, if a block is identified to start with an HTML file header and has a few other HTML tags, then the fragmentation point is deemed to be detected because it is assumed that the adjacent blocks belong to different types of files. Similarly, certain keywords are not expected to be seen during the process of recovery (like invalid JPEG markers). Such keywords can therefore be used for detecting fragmentation points.

Regarding analyzing content indicating an incorrect block, an abrupt change in characteristics of the data might indicate a potential fragmentation point. For example during the recovery of a JPEG file, if blocks containing English words were encountered, this would indicate that the fragmentation has occurred.

While this type of approach may determine, with certainty, that a block does not belong to a particular file, such methods, on their own, can't determine whether or not the previous blocks belong to the file. In the simple example shown in FIGS. 3A-3C, a first JPEG file has been fragmented into two pieces, where the first fragment includes four (4) blocks, the second fragment includes two (2) blocks, and there are three unknown blocks in between. If the first of the unknown blocks has the starting (header) signature of another JPEG file as shown in FIG. 3B, then it may be determined that the first of the unknown blocks does not belong to the first JPEG file. It will be much harder to detect the presence of fragmentation using this approach when there are a large number of fragmented files.

§4.3.2 Statistical Tests

Statistical tests attempt to compare the statistics of each block to a model for each file type and then classify the block. Some examples of statistical tests involve entropy of each block and the OSCAR method. (See, e.g., the Karresand-Shahmehri articles.) The Oscar method builds models, called centroids, of the mean and standard deviation of the byte frequency distribution of different file types. A block is compared to all models and a determination made as to which file type it seems to conform to. Like the syntatical tests described in §4.3.1 above, these tests are also unable to detect the actual fragmentation point. In addition, blocks can be falsely identified as belonging to another file type.

§4.3.3 Basic Sequential Validation

Another simple technique to identify the fragmentation point is to start validating blocks sequentially, starting at the header and continuing until the validator (decoder) stops with an error. With this technique the last correctly validated block is deemed to be the fragmentation point. In FIG. 3C, validation starts at the first block and continues until it fails at block five, leading to the conclusion that fragmentation point is at block 4.

However, it is possible for a validator to successfully validate random blocks of data, which will result in an inaccurate recovery of a file. Indeed, this is quite common and is not at all unusual.

§4.4 Exemplary Embodiments Consistent with the Present Invention (Refined File Carving)

Figure 4:
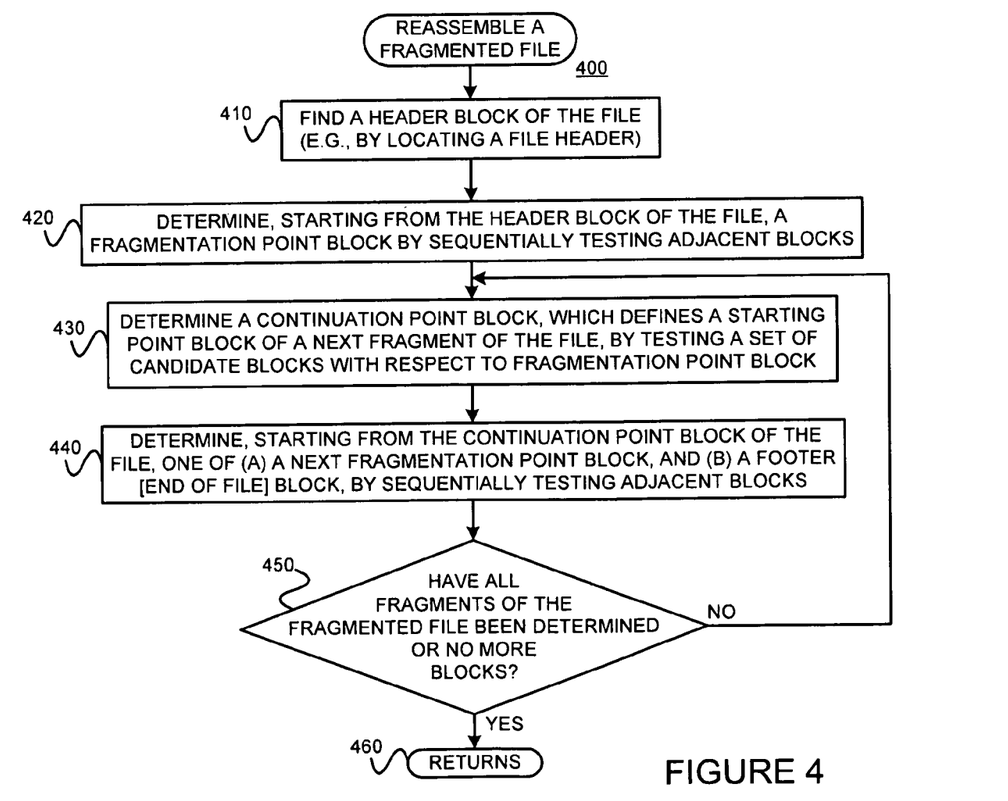
FIG. 4 is a flow diagram of an exemplary method for reassembling a fragmented file in a manner consistent with the present invention.

FIG. 4 is a flow diagram of an exemplary method 400 for reassembling a fragmented file in a manner consistent with the present invention. A header block of the fragmented file is found (e.g., by locating a file header). (Block 410) Then, starting from the header block of the file, a fragmentation point block is determined by sequentially testing adjacent blocks. (Block 420) A continuation point block, which defines a starting point block of a next fragment of the file, is then determined by testing a set of candidate blocks with respect to fragmentation point block. (Block 430) Starting from the continuation point block of the file, either (A) a next fragmentation point block, or (B) a footer (e.g., end of file) block, is determined by sequentially testing adjacent blocks. (Block 440) If all fragments of the fragmented file have not been determined and there are still blocks, the method 400 proceeds back to block 430. (Condition block 450). Otherwise, the method 400 is left. (Node 460)

Referring back to block 420, in at least some embodiments consistent with the present invention, the act of sequentially testing adjacent blocks applies at least one match threshold.

Referring back to block 430, in at least some embodiments consistent with the present invention, the act of determining a continuation point block finds the one of the candidate blocks that has the highest match score with respect to the fragmentation point block relative to the match scores of the other candidate blocks with respect to the fragmentation point block. The act of determining a continuation point block might find the one of the candidate blocks that has the highest match score with respect to the fragmentation point block relative to the match scores of the other candidate blocks with respect to the fragmentation point block, where the candidate block that has the highest match score has no higher match score with any other fragmentation point block.

Figure 5:
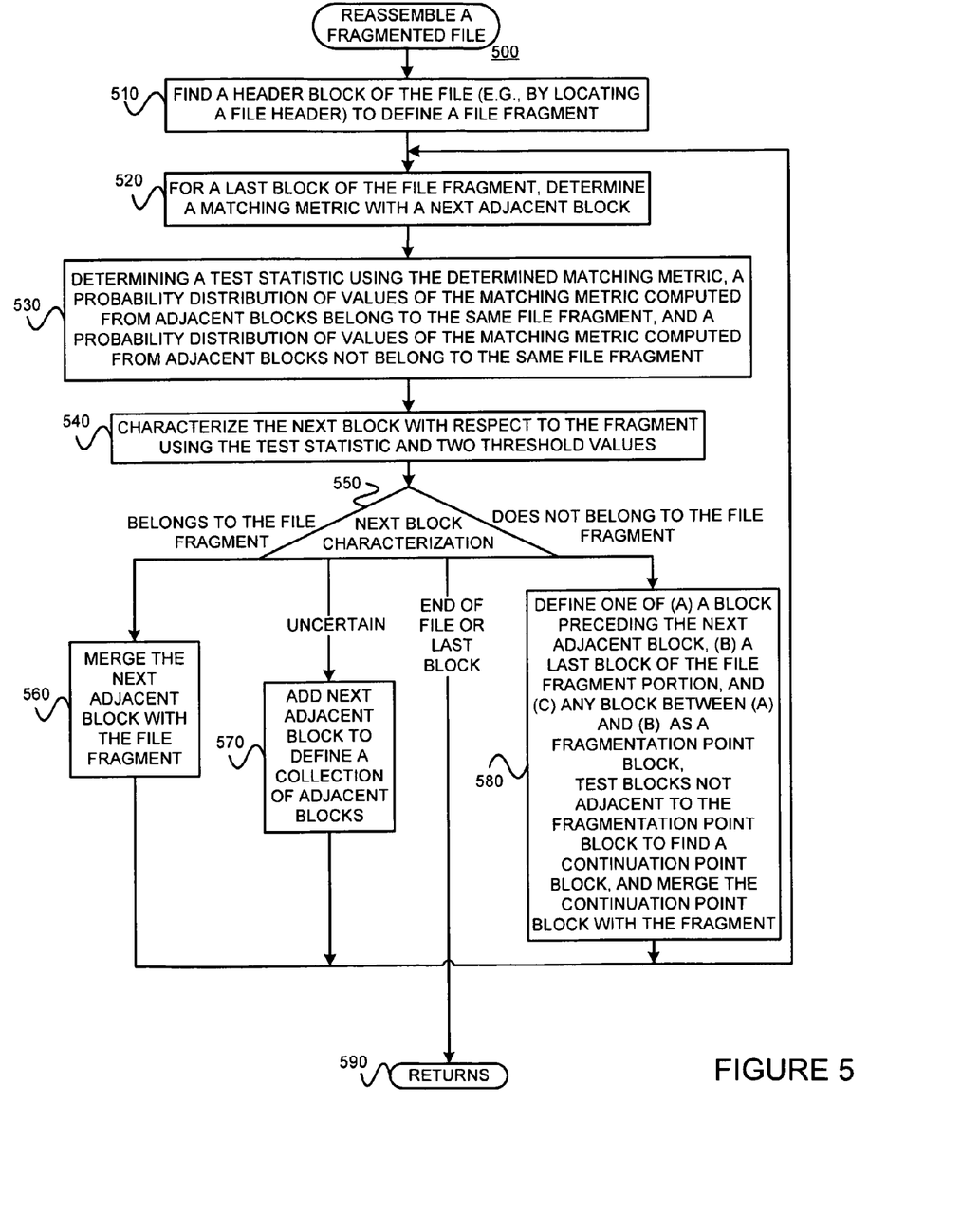
FIG. 5 is a flow diagram of an exemplary method for reassembling a fragmented file in a manner consistent with the present invention.

FIG. 5 is a flow diagram of an exemplary method 500 for reassembling a fragmented file in a manner consistent with the present invention. A header block of the file is found (e.g., by locating a file header) to define a file fragment. (Block 510) Then, for a last block for the file fragment, a matching metric with a next adjacent block is determined. (Block 520). A test statistic is then determined using the determined matching metric, a probability distribution of values of the matching metric computed from adjacent blocks belong to the same file fragment, and a probability distribution of values of the matching metric computed from adjacent blocks not belong to the same file fragment is then determined, or the test statistic is simply received. (Block 530) The next adjacent block is then characterized as either (A) belonging to the file fragment, (B) not belonging to the file fragment, or (C) uncertain as to whether or not it belongs to the file fragment, using the test statistic and two threshold values. (Block 540) If it was determined that the next adjacent block belongs to the file fragment, then the next adjacent block is merged with the file fragment, and the method branches back to block 520. (Blocks 550 and 560) If it was determined that the next adjacent block does not belong to the file fragment, then a block preceding the next adjacent block is defined as a fragmentation point block (or one of the sequence of blocks under consideration is defined as a fragmentation point using a reverse test as described in §4.1.2 above), blocks not adjacent to the fragmentation point block are tested to find a continuation point block, the continuation point block is merged with the fragment, and the method 500 branches back to block 520. (Blocks 550 and 580) If, on the other hand, whether or not the next adjacent block belongs to the file fragment could not be determined with a requisite level of certainty, a next adjacent block is added to define a collection of adjacent blocks, and the method 500 branches back to block 520. (Blocks 550 and 570) Finally, if the next block includes the end of the file, or is the last block, the method 500 is left. (Block 550 and node 590)

Referring back to block 520, in at least some embodiments consistent with the present invention, the act of determining a matching metric uses entropy of data in the block and the next block.

Figure 6:
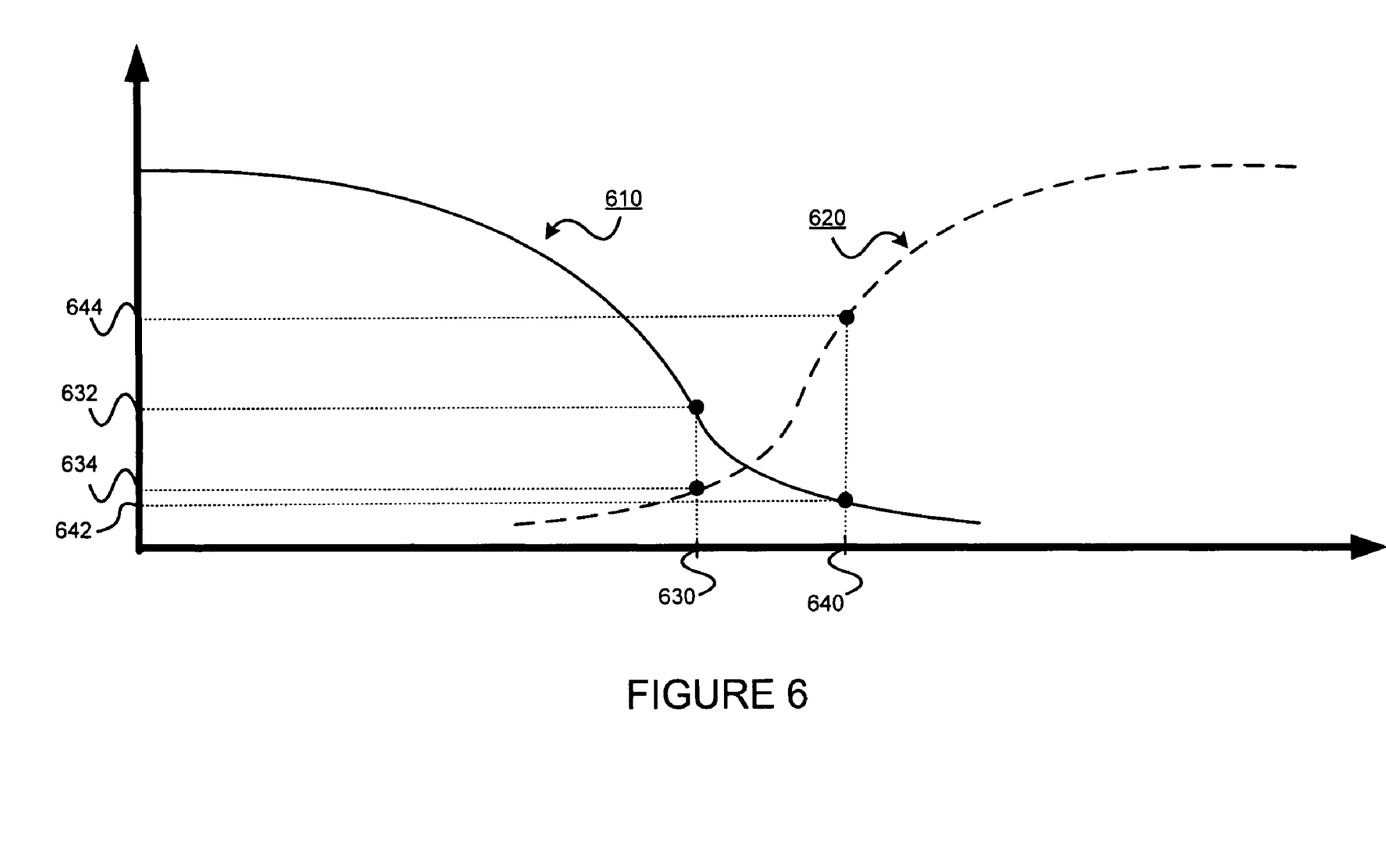
FIG. 6 illustrates two examples of how test statistics can be determined from match metrics with respect to a probability distribution that adjacent blocks don't belong to the same fragment and with respect to a probability distribution that adjacent blocks belong to the same fragment.

Referring back to block 530, a test statistic may be determined as described in §4.1.1 above. FIG. 6 illustrates two examples of how two test statistics can be determined from two match metrics 630 and 640 with respect to a probability distribution 610 that adjacent blocks don't belong to the same fragment (Recall $H_1$.) and with respect to a probability distribution 620 that adjacent blocks belong to the same fragment (Recall $H_0$.). For the first exemplary match metric 630, the probability that the blocks don't belong to the same fragment is $\Pr(Y_{ex1}|H_1)$ 632 and the probability that the blocks belong to the same fragment is $\Pr(Y_{ex1}|H_0)$ 634. The test statistic $\Lambda(Y_{ex1})$ can then be determined using equation (1), described in §4.1.1 above. For the second exemplary match metric 640, the probability that the blocks don't belong to the same fragment is $\Pr(Y_{ex2}|H_1)$ 642 and the probability that the blocks belong to the same fragment is $\Pr(Y_{ex2}|H_0)$ 644. The test statistic $\Lambda(Y_{ex1})$ can then be determined using equation (1), described in §4.1.1 above.

Referring back to block 540, in at least some embodiments consistent with the present invention, it is determined that the next adjacent block belongs to the file fragment if the test statistic is less than a first of the two threshold values, it is determined that the next adjacent block does not belong to the file fragment if the test statistic is greater than a second of the two threshold values, and it is otherwise determined that it is uncertain whether or not the next adjacent block belongs to the file fragment.

Referring back to block 580, in at least some embodiments consistent with the present invention, the act of testing blocks not adjacent to the fragmentation point block to find a continuation point block (if it was determined that the next adjacent block does not belong to the file fragment) includes (1) receiving a predetermined number of next blocks to define a first set of blocks, (2) classifying blocks of the first set by file type to define a second set of blocks including only those blocks of the first set that are of the same file type as the fragmentation point block, (3) removing blocks of the second set that already belong to or include a header to define a third set of blocks, (4) for each of a plurality of N header blocks, finding the top M best next blocks from the third set, and (5) defining as the continuation point block, a block best matching the fragmentation point block that does not have a better match with any of the other N header blocks. In such embodiments, the act of defining as the continuation point block, a block best matching the fragmentation point block that does not have a better match with any of the other N header blocks might use a greedy heuristic, such as a parallel unique path algorithm for example. Naturally, other techniques for reassembling files, such as those described in the Pal-Memon article for example, may use SHT.

§4.5 Apparatus

Figure 7:
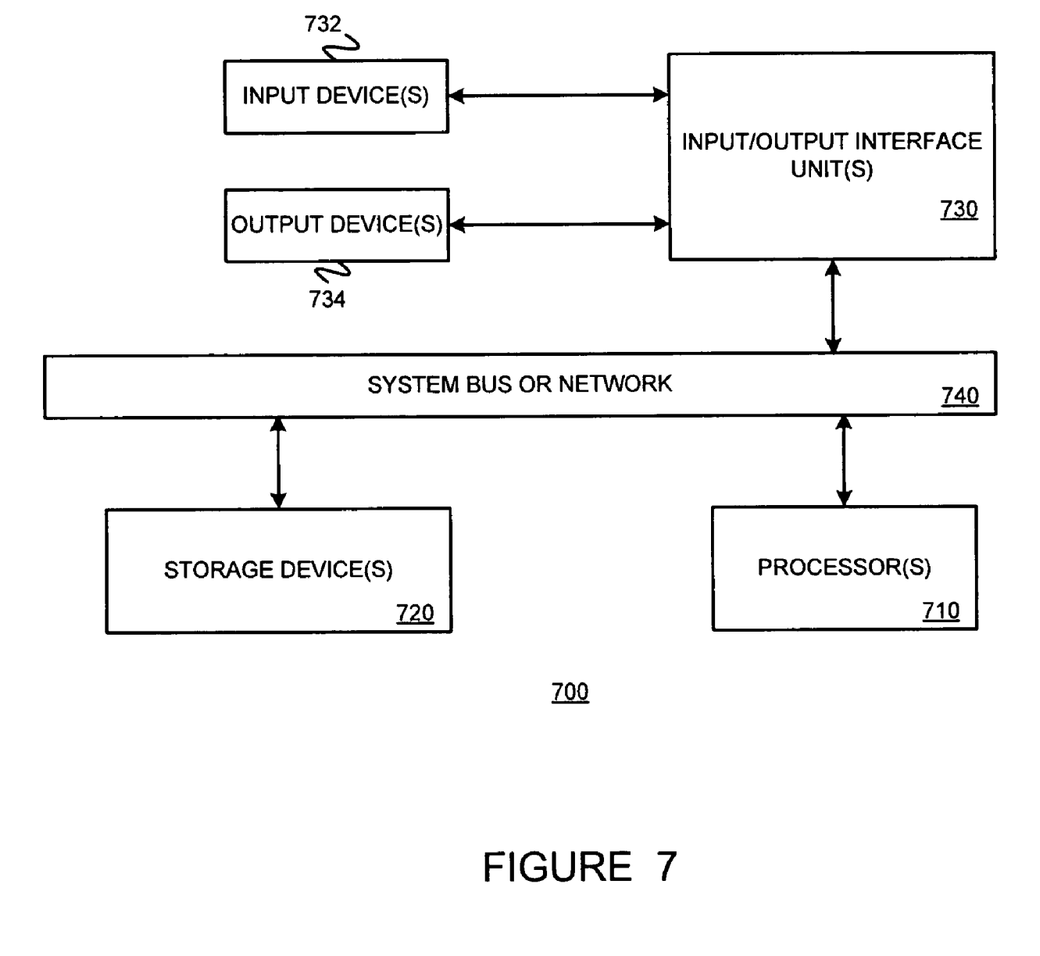
FIG. 7 is a block diagram of apparatus that may be used to perform at least some operations, and store at least some information, in a manner consistent with the present invention.

FIG. 7 is a block diagram of apparatus 700 that may be used to perform at least some operations, and store at least some information, in a manner consistent with the present invention. The apparatus 700 may include one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. For example, one or more software modules, when executed by a processor, may be used to perform one or more of the methods described above. At least a portion of the machine executable instructions may be stored (temporarily or more permanently) on the one or more storage devices 720 and/or may be received from an external source via one or more input interface units 730.

In one embodiment, the machine 700 may be one or more conventional personal computers or servers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

The operations described above may be performed on one or more computers. Such computers may communicate with each other via one or more networks, such as the Internet for example.

Figure 8:
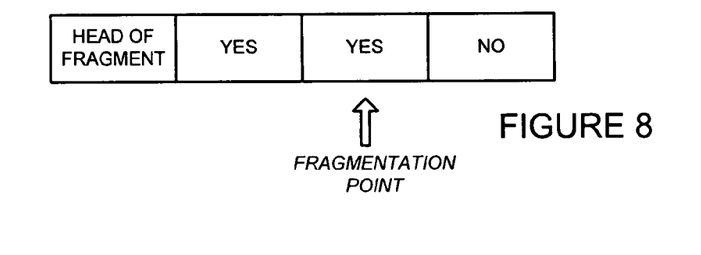
FIGS. 8-10 illustrate examples of how a fragmentation point can be determined using techniques consistent with the present invention.
Figure 9:
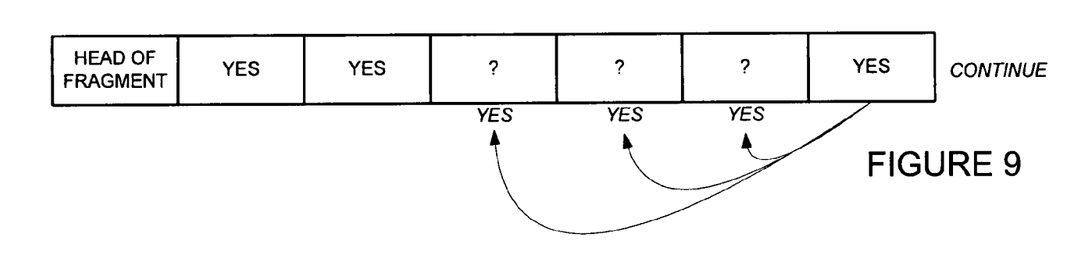
Figure 10:
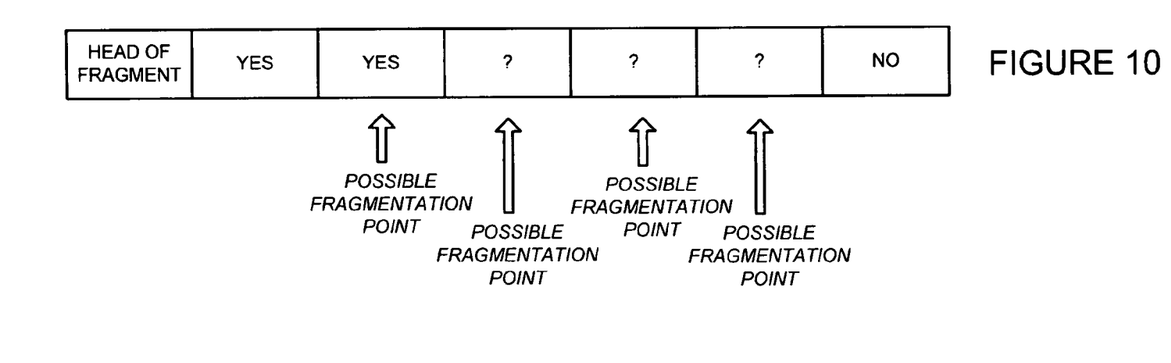

§4.6 Examples Illustrating Operations of Exemplary Embodiments Consistent with the Present Invention FIGS. 8-10 illustrate examples of how a fragmentation point can be determined using techniques consistent with the present invention. In FIG. 8, the two blocks following the "head of fragment" block are determined to belong to the fragment (YES). Since the next block is determined to not belong to the fragment (NO), the fragmentation point is at the previous block (as shown).

In FIG. 9, the two blocks following the "head of fragment" block are determined to belong to the fragment (YES). It cannot be determined with the desired degree of certainty whether or not the next three blocks belong to the fragment (?). Since, however, it is determined that the next block belongs to the fragment (YES), the three previously uncertain blocks are also considered to belong to the fragment (?→YES).

In FIG. 10, the two blocks following the "head of fragment" block are determined to belong to the fragment (YES). It cannot be determined with the desired degree of certainty whether or not the next three blocks belong to the fragment (?). However, it is determined that the next block does not belong to the fragment (NO). Since there are four possible fragmentation points (as shown), reverse processing is applied starting with the (NO) block in order to find the fragmentation point.

§4.7 Conclusions

As can be appreciated from the foregoing, exemplary embodiments consistent with the present invention may be used to provide a fast, accurate and scalable way to reconstruct fragmented files.

What is claimed is:

1. A computer-implemented method for reassembling a fragmented file comprising:
    a) locating a file header to find a header block of the file;
    b) determining a fragmentation point block by sequentially testing, starting from the header block of the file, adjacent blocks, wherein the act of sequentially testing adjacent blocks analyzes content of the adjacent blocks and applies at least one match threshold, and wherein the act of determining a fragmentation point block is performed independent of a footer block of the fragmented file;
    c) determining a continuation point block, which defines a starting point block of a next fragment of the file, by testing a set of candidate blocks with respect to fragmentation point block;
    d) determining one of (A) a next fragmentation point block, (B) the footer block, and (C) an end of fragment block, by sequentially testing, starting from the continuation point block of the file, adjacent blocks; and
    e) repeating (c) and (d) until one of (A) all fragments of the fragmented file have been determined, and (B) no more blocks can be found.

2. The computer-implemented method of claim 1 wherein the act of determining a continuation point block finds the one of the candidate blocks that has the highest match score with respect to the fragmentation point block relative to the match scores of the other candidate blocks with respect to the fragmentation point block.

3. The computer-implemented method of claim 1 wherein the act of determining a continuation point block finds the one of the candidate blocks that has the highest match score with respect to the reconstructed fragment relative to the match scores of the other candidate blocks with respect to the reconstructed fragment.

4. The computer-implemented method of claim 1 wherein the act of determining a continuation point block finds the one of the candidate blocks that has the highest match score with respect to any reconstructed fragments of the fragmented file relative to the match scores of the other candidate blocks with respect to any reconstructed fragments of the fragmented file.

5. The computer-implemented method of claim 1 wherein the act of determining a continuation point block finds the one of the candidate blocks that has the highest match score with respect to the fragmentation point block relative to the match scores of the other candidate blocks with respect to the fragmentation point block, and wherein the one of the candidate blocks that has the highest match score has no higher match score with any other fragmentation point block.

6. A computer-implemented method for assembling a file fragment, the computer-implemented method comprising:
   a) locating a file header to find a header block of the file to define a file fragment portion;
   b) determining, starting from the header block of the file, a fragmentation point block by sequentially testing adjacent blocks, wherein sequentially testing adjacent blocks includes
      1) for a last block of the file fragment portion, determining a matching metric with a next adjacent block using content of the last block of the file fragment portion and the next adjacent block,
      2) determining a test statistic using the determined matching metric, a probability distribution of values of the matching metric computed from adjacent blocks belong to the same file fragment, and a probability distribution of values of the matching metric computed from adjacent blocks not belong to the same file fragment,
      3) determining either
         (A) the next adjacent block belongs to the file fragment,
         (B) the next adjacent block does not belong to the file fragment, or
         (C) it is uncertain whether or not the next adjacent block belongs to the file fragment, using the test statistic and two threshold values,
      4) if it was determined that the next adjacent block belongs to the file fragment, then
         (A) merging the next adjacent block with the file fragment to define an updated file fragment portion, and
         (B) repeating acts (b)(1) through (b)(4), if it was determined that the next adjacent block does not belong to the file fragment, then
         (A) defining one of (i) a block preceding the next adjacent block, (ii) a last block of the file fragment portion, and (iii) a block between the block preceding the next adjacent block and the last block of the file fragment portion, as a fragmentation point block,
         (B) testing blocks not adjacent to the fragmentation point block to find a continuation point block,
         (C) merging the continuation point block with the fragment, and
         (D) repeating acts (b)(1) through (b)(4), otherwise, repeating acts (b)(1) through (b)(4) with a collection of adjacent blocks, which starts with the next adjacent block, until it is determined that either (A) the collection of adjacent blocks belongs to the file fragment, or (B) at least some of the collection of adjacent blocks do not belong to the file fragment.

7. The computer-implemented method of claim 6 wherein the act of determining a matching metric uses entropy of data in the block and the next block.

8. The computer-implemented method of claim 6 wherein it is determined that the next adjacent block belongs to the file fragment if the test statistic is less than a first of the two threshold values, it is determined that the next adjacent block does not belong to the file fragment if the test statistic is greater than a second of the two threshold values, and it is otherwise determined that it is uncertain whether or not the next adjacent block belongs to the file fragment.

9. The computer-implemented method of claim 6, wherein the act of testing blocks not adjacent to the fragmentation point block to find a continuation point block, if it was determined that the next adjacent block does not belong to the file fragment, includes
   receiving a predetermined number of next blocks to define a first set of blocks;
   classifying blocks of the first set by file type to define a second set of blocks including only those blocks of the first set that are of the same file type as the fragmentation point block;
   removing blocks of the second set that already belong to or include a header to define a third set of blocks, and
   determining the continuation point block from the third set of blocks.

10. The computer-implemented method of claim 6 wherein the act of defining one of (i) a block preceding the next adjacent block, (ii) a last block of the file fragment portion, and (iii) a block between the block preceding the next adjacent block and the last block of the file fragment portion, as a fragmentation point block uses a reverse sequential hypothesis test starting from the next adjacent block determined not to belong to the file fragment.

11. The computer-implemented method of claim 6 wherein the act of defining as the continuation point block, a block best matching the fragmentation point block that does not have a better match with any of a plurality of fragments, each of the plurality of fragments starting with a header block and ending with a fragmentation point, uses a parallel unique path algorithm.

12. Apparatus for reassembling a fragmented file, the apparatus comprising:
   a) at least one processor; and
   b) at least one storage device storing processor-executable instructions which, when executed by a processor, performing a method including
      1) locating a file header to find a header block of the file,
      2) determining a fragmentation point block by sequentially testing, starting from the header block of the file, adjacent blocks, wherein the act of sequentially testing adjacent blocks analyzes content of the adjacent blocks and applies at least one match threshold, and wherein the act of determining a fragmentation point block is performed independent of a footer block of the fragmented file,
      3) determining a continuation point block, which defines a starting point block of a next fragment of the file, by testing a set of candidate blocks with respect to fragmentation point block,
      4) determining one of (A) a next fragmentation point block, (B) the footer block, and (C) an end of fragment block, by sequentially testing, starting from the continuation point block of the file, adjacent blocks, and
      5) repeating (3) and (4) until one of (A) all fragments of the fragmented file have been determined, and (B) no more blocks can be found.

13. The apparatus of claim 12 wherein the act of determining a continuation point block finds the one of the candidate blocks that has the highest match score with respect to the fragmentation point block relative to the match scores of the other candidate blocks with respect to the fragmentation point block.

14. The apparatus of claim 12 wherein the act of determining a continuation point block finds the one of the candidate blocks that has the highest match score with respect to the reconstructed fragment relative to the match scores of the other candidate blocks with respect to the reconstructed fragment.

15. The apparatus of claim 12 wherein the act of determining a continuation point block finds the one of the candidate blocks that has the highest match score with respect to any reconstructed fragments of the fragmented file relative to the match scores of the other candidate blocks with respect to any reconstructed fragments of the fragmented file.

16. The apparatus of claim 12 wherein the act of determining a continuation point block finds the one of the candidate blocks that has the highest match score with respect to the fragmentation point block relative to the match scores of the other candidate blocks with respect to the fragmentation point block, and wherein the one of the candidate blocks that has the highest match score has no higher match score with any other fragmentation point block.

17. Apparatus for assembling a file fragment, the apparatus comprising:
   a) at least one processor; and
   b) at least one storage device storing processor-executable instructions which, when executed by a processor, performing a method including,
      1) locating a file header to find a header block of the file to define a file fragment portion;
      2) determining, starting from the header block of the file, a fragmentation point block by sequentially testing adjacent blocks, wherein sequentially testing adjacent blocks includes
         A) for a last block of the file fragment portion, determining a matching metric with a next adjacent block using content of the last block of the file fragment portion and the next adjacent block,
         B) determining a test statistic using the determined matching metric, a probability distribution of values of the matching metric computed from adjacent blocks belong to the same file fragment, and a probability distribution of values of the matching metric computed from adjacent blocks not belong to the same file fragment,
         C) determining either
            (i) the next adjacent block belongs to the file fragment,
            (ii) the next adjacent block does not belong to the file fragment, or
            (iii) it is uncertain whether or not the next adjacent block belongs to the file fragment,
         using the test statistic and two threshold values,
         D) if it was determined that the next adjacent block belongs to the file fragment, then
            (i) merging the next adjacent block with the file fragment to define an updated file fragment portion, and
            (ii) repeating acts (1)(A) through (2)(D),
         if it was determined that the next adjacent block does not belong to the file fragment, then
            (i) defining one of a block preceding the next adjacent block, a last block of the file fragment portion, and a block between the block preceding the next adjacent block and the last block of the file fragment portion, as a fragmentation point block,
            (ii) testing blocks not adjacent to the fragmentation point block to find a continuation point block,
            (iii) merging the continuation point block with the fragment, and
            (iv) repeating acts (2)(A) through (2)(D),
         otherwise, repeating acts (2)(A) through (2)(D) with a collection of adjacent blocks, which starts with the next adjacent block, until it is determined that either the collection of adjacent blocks belongs to the file fragment, or at least some of the collection of adjacent blocks do not belong to the file fragment.

18. The computer-implemented method of claim 6 wherein the act of repeating acts (b)(1) through (b)(4) with a collection of adjacent blocks, which starts with the next adjacent block, until it is determined that either (A) the collection of adjacent blocks belongs to the file fragment, or (B) at least some of the collection of adjacent blocks do not belong to the file fragment uses a reverse sequential hypothesis test.

19. The apparatus of claim 17 wherein the act of repeating acts (2)(A) through (2)(D) with a collection of adjacent blocks, which starts with the next adjacent block, until it is determined that either the collection of adjacent blocks belongs to the file fragment, or at least some of the collection of adjacent blocks do not belong to the file fragment uses a reverse sequential hypothesis test.

* * * * *